United States Patent [19]
Yourgalite et al.

[11] Patent Number: 4,995,224
[45] Date of Patent: Feb. 26, 1991

[54] STRETCH WRAPPING PALLETIZER

[75] Inventors: Ray A. Yourgalite, Hoopeston, Ill.;
Malcolm Moore, Green Bay, Wis.;
Neal C. Chamberlain, Hoopeston, Ill.;
Kenneth F. Becicka, Alvin, Ill.;
Samuel J. Hilgeman, Hoopeston, Ill.;
Kevin D. Moore, Potomac, Ill.

[73] Assignee: FMC Corporation, Chicago, Ill.

[21] Appl. No.: 445,936

[22] Filed: Dec. 5, 1989

Related U.S. Application Data

[63] Continuation of Ser. No. 167,949, Mar. 14, 1988, abandoned.

[51] Int. Cl.[5] .............................................. B65B 11/04
[52] U.S. Cl. ...................................... 53/540; 53/556; 53/587; 53/588
[58] Field of Search ................. 53/399, 441, 447, 556, 53/540, 587, 588, 211, 212; 414/65, 66

[56] References Cited

U.S. PATENT DOCUMENTS

| | | | |
|---|---|---|---|
| 3,412,524 | 11/1968 | Nestell | 53/212 |
| 3,554,388 | 1/1971 | Thompson | 414/66 X |
| 3,620,383 | 11/1971 | Ingram | 414/66 X |
| 3,994,114 | 11/1976 | Mishimura | 53/447 X |
| 4,216,640 | 8/1980 | Kaufman | 53/556 |
| 4,461,136 | 7/1984 | Hudson | 53/587 X |
| 4,563,857 | 1/1986 | Bergling | 53/441 X |
| 4,593,517 | 6/1986 | Mattila | 53/556 X |
| 4,607,476 | 8/1986 | Fucton, Jr. | 53/556 X |

FOREIGN PATENT DOCUMENTS

WO81/03316 11/1981 PCT Int'l Appl. .................. 53/447

OTHER PUBLICATIONS

Models 500 & 300 Robot Palletizers–pp. 88-91 and 95 of FMC Food Machinery Catalog 184—date received in PTO-10/10/85.

*Primary Examiner*—John Sipos
*Attorney, Agent, or Firm*—Douglas W. Rudy; Richard B. Megley

[57] ABSTRACT

An article stack unifying device having article stacking elements is provided to stack a plurality of articles on a surface on or of a rotatable surface. While the articles are being stacked on the selected surface a quantity of wrapping film is wrapped around the stack of articles at intervals during the stacking process and at the completion of the stack.

2 Claims, 4 Drawing Sheets

FIG_2

FIG_3

STRETCH WRAPPING PALLETIZER

This application is a continuation of application Ser. No. 07/167,949, filed 3/14/88, now abandoned.

This invention discloses and concerns a robotic article stack unitizer having the capability of receiving discrete articles from a source of supply. transferring those articles to an article stacking station where the articles are stacked on a "pull sheet", a base sheet, in a low sided box, on a pallet or directly on the surface of the article stacking station and then providing a film wrap around the stacked articles in order to "build" a stable unitized or palletized load. For readability of this specification the terms "palletizer" and its derivatives such as "palletizing, palletized, pallet" and the like is used to mean any type of stacked article unitizing where the articles are stacked on a pallet, a sheet surface or on the surface of the unitizer's turntable where no bottom sheet or pallet is used.

In prior art palletizing systems it has been normal practice to feed or serve a product to a pallet supported on a work stand. Each article, or groups of articles making up a palletized load, would be placed on the pallet in a location to maximize the number of elements that can be stacked on a pallet while also attempting to interlock the elements in order to provide some stability to the load once it has been fully accumulated on the pallet.

After stacking articles or elements to form a full pallet the full pallet is then removed from the work stand and delivered to a wrapping station having a strapping machine, a shrink wrapping machine, a stretch wrapper or other type of wrapping equipment. At this wrapping station the palletized load is wrapped or banded in order to provide continuity and stability to the load.

The apparatus or device presented in this disclosure is an advanced robotic palletizer or stack unitizer, which in itself is an advanced palletizing unit that incorporates a programmable material handling element that will typically pick up an article or articles to be stacked from a supply conveyor or location and then position these articles on a pallet or on previously palletized articles. The programmed material handling element will stack the articles in a preassigned location on the pallet that will provide a degree of load stabilization by the interlocking, overlapping or cross stacking of the articles on the pallet. Such interlocking is not a true interlocking of stacked articles but is more of an overlapping of boxes stacked on one another so that straight columns are not formed of the boxes or articles being stacked. In many cases the palletized loads are not significantly stable.

Integral with the advanced robotic palletizer is equipment that allows the robotic palletizer to wrap the stacked pallet in a film of plastic material that assists in stabilizing the palletized load.

The robotic palletizer is provided with sensors or alternatively a preprogrammed sequence of operations, that direct the palletizer to initiate wrapping of the load at the most favorable intermediate layers, prior to the final stack height and complete wrapping of the load.

A film supply source is supported on the palletizer equipment and can move vertically as film is being unwound, being guided by various guide rollers, to wrap the accumulated articles on the pallet as the pallet is being "built".

One of the advantages of the invention is that column stacks of boxes or articles can be made since the pallet load is wrapped at intervals during the building of the palletized load thus increasing the stack integrity. By allowing column stacks, rather than the interlocked stacks of previously known palletizers, the inherent strength of the boxes or cartons can be utilized in order to create strong unified, unitized stacks of products. This of course allows greater stack height, heavier loads, more dense loading on a pallet resulting in better pallet utilization and the advantages attendant thereto such as decreased shipping costs, and of utmost importance a decrease in damage to the carton contents resulting from collapse of the boxes on the lower levels of the stack.

Many other advantages of this invention will be apparent from a careful perusal of this specification and disclosure when read in conjunction with the drawing figures provided herein.

DETAILED DESCRIPTION OF THE INVENTION

Figures 1, 6:
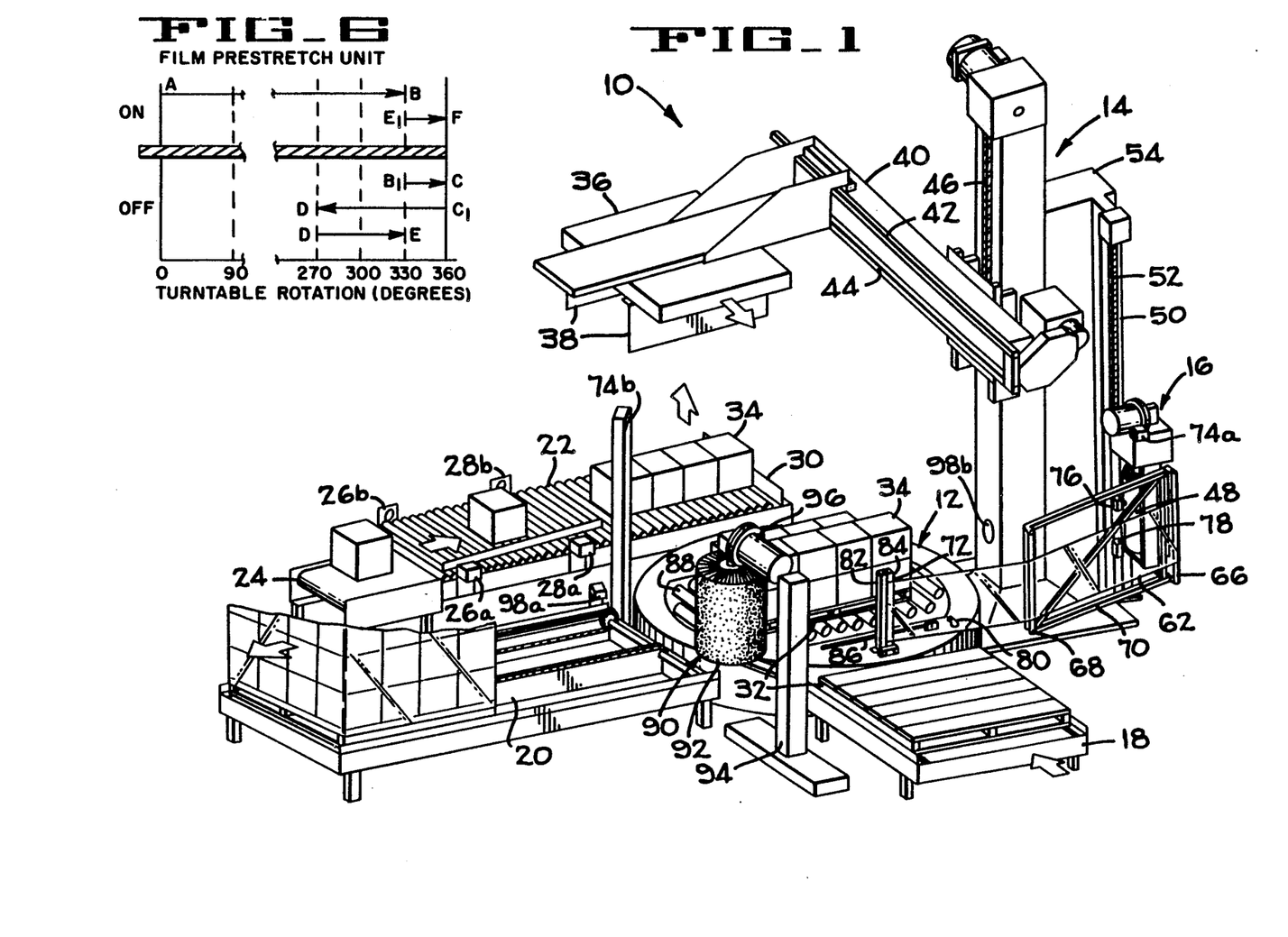
FIG. 1 is a simplified isometric presentation of the invention.
FIG. 6 is a timing chart.

The FIG. 1 presentation shows the general arrangement of the palletizer and this figure will be described first. Like reference characters in the other views represent the same parts as in this view.

The palletizer, generally 10, is made up of three major components. The turntable, generally 12 which may be rotatable at any desired speed, the robotic palletizer generally 14 and the film elevator generally 16 are the major components. Several satellite components of a preferred embodiment of the palletizer are also shown. A pallet infeed or supply conveyor 18 is located adjacent the turntable and will serve a pallet to the turntable on demand. Once a pallet is fully loaded and wrapped the pallet will be shuttled to the pallet discharge conveyor 20. Product infeed is directed to the palletizer by means of the product conveyor 22.

As stated earlier in this specification the apparatus is contemplated as being able to stack and wrap articles on alternate surfaces such as "pull sheets", base sheets, low sided boxes and the like or even directly on the surface of the turntable. A preferred embodiment may include stacking on a conventional pallet however equally good utility can be realized when using the apparatus to stack and wrap on alternatives such as the surface of the turntable.

In the event that a conventional pallet is not being used it would be appropriate to eliminate, if so desired, the pallet supply conveyor and possibly the output conveyor.

Logically, starting with the product conveyor 22, a metering infeed conveyor 24 will be the first element of the palletizer operation encountered by an article or package such as 25 to be palletized. The package, box means, or article such as 25 could be of any configuration that is stacked for shipment or storage on a pallet, a pull sheet or the like or the surface of the turntable. Typically the box means 25 could be a box, can, carton, open top carton, tray of material, nested elements such as buckets, or eVen sacks or bags of material, containers or pouches. The term "box means" is not intended to be limiting and is used as a generic for stackable materials being stacked together. For readability of this specification the "box means" will be referred to as "boxes" or its derivatives.

The metering infeed conveyor 24 may be equipped with a rough surface top belt to provide separation between boxes as it delivers the boxes to the product conveyor 22. Boxes may be aligned to one side of the metering infeed conveyor by an adjustable rail guide 27. The product conveyor, also known as a station conveyor or input station means, is a live roller assembly in a preferred embodiment. Two or more photoeye sets are used on this conveyor. Each set 26 a and b and 28 a and b consists of a source/receiver component, the "a" components, and a reflector, the "b" components, which reflect the light from the source back to the receivers. This is conventional technology. Various types of sensors which may or may not require reflectors may be used in place of the photoeye sets set out herein. Throughout this specification photoeyes and reflectors are discussed however these are simply one means of sensing contemplated by the inventor. The first photoeye set 26 is used to count boxes entering the station conveyor. The second photoeye set is used to detect when the last of a set of boxes 34 has accumulated on the station conveyor.

The "set of boxes" 34 is that quantity of boxes that should be accumulated before they are picked up by the robotic palletizer and transferred to the turntable generally 12. A set of boxes 34 would be, for instance, the four boxes in contact with each other on the station conveyor 22.

A case stop, which stops the boxes on the conveyor is shown as 30. Other case stops, not shown, may be positioned below the roller bed and activated as necessary to interpose gaps between the boxes being accumulated.

Once a set of boxes 34 is accumulated the robotic palletizer can transfer them to an awaiting pallet on the turntable 12. Any incoming upstream boxes no necessary to complete a set of boxes will be stopped until the full set of boxes has been picked up by the robotic palletizer and clears the station conveyor.

In a normal cycle a pallet 32, or the equivalent of a pallet such as a skid, "pull sheet", base sheet platform, container means or the like, will be in position on the turntable. Obviously, in the event that a unitized load is to be built without a pallet or base sheet no pallet or the like need be in position. The set of boxes 34 will now be lifted by the grasping means 36 which may have any one of numerous types of "hands". FIG. 1 shows the use of "palms" 38, two of which, an inboard palm and an outboard palm have been marked as 38. One of the palms are stationary and the other of the palms may be operated by an air cylinder (or other closing or actuating means) to move toward the set of boxes 34 and clamp or grasp them between the palms. "Hand" type is determined by application and a myriad of hand types, including multiple palms, bottom support hands, vacuum, and top and bottom clamping, and the like, are known in the industry. The hand may also be articulated or movable on its support on an axis perpendicular to the boom axis.

The structure of the grasping means 36 is carried through cam rollers to a boom 40. The rollers of the grasping means ride on and, in the case of the upper rail, rails 42 and in the case of the lower rail, 44 so that the grasping means 36 can traverse laterally from a location above the station conveyor 22 to a specific discharge location on the pallet on the turntable 12. The turntable is stabilized at a fixed vertical height, as shown in FIG. 1, while the pallet load is being formed.

The boom 40 is slidably mounted on the mast 46 so that the boom can move vertically on the mast. In a typical "pick-and-place" the two axis provided by the mast and the boom would be sufficient to transfer boxes or sets of boxes from the station conveyor 22 to the pallet 32. The operation proceeds as follows: The hand 36, poised above the set of boxes 34, is lowered, the hand clamps causing the palms to grip the set of boxes, the boom raises on the mast, the grasping means 36 moves along the boom 40, the boom 40 moves down the mast 46 the hand opens depositing the set of boxes 34 on the pallet in a predetermined location. To return to start the palms of the grasping means 36 are opened away from each other, the boom raises away from the pallet, the grasping means 36 moves back along the boom 40, the boom moves down the mast 46 and the grasping means is ready to grasp another set of boxes. The palletizer is programmed to initiate movement travel, change speed and find the proper position for palletizing the sets of boxes in the predetermined desired stacking pattern.

After a palletized load has been partially "built", that is stacked in a predetermined pattern, the partially palletized load can be partially wrapped with film to add stability to the partially palletized load. The stacking pattern incorporated in building pallet loads has traditionally been one that seeks to maximize the number of boxes on the host pallet while interlocking the boxes to help in palletized load stability and integrity. Oftentimes this requires that certain boxes be aligned along one axis of the pallet and the other boxes are aligned along a second axis. On the next level or layer of boxes the boxes will be aligned in opposite directions so that a certain amount of interlocking will take place. Seldom are boxes stacked in vertical columns by today's palletizers. Although the column strength is much better when boxes are stacked directly on top of each other as the boxes can be arranged so that the strongest parts of the boxes, the corners, are stacked on top of each other from box to box, the resulting tall column is very unstable and all but unusable in practice. The instant invention however does provide for effective column stacking and thus the apparatus of this invention can provide a much more stable and strong palletized loads than have been possible in the past.

Once a partial pallet load has been stacked on a pallet, or a pallet means; in a preferred embodiment a partial pallet load could be as few as two layers of boxes (wrapping can be done after only a single layer of boxes has been stacked on the pallet however this would not be a preferred embodiment); the wrapping operation will be initiated by the controller for the palletizer.

Wrap means, usually a plastic film that has high hysteresis after initial stretching, conventionally known as "stretch wrap" film, is the preferred wrap means for carrying out the intended purpose and operation of this equipment.

Wrap means can be other types of film such as shrink wrap film, polymer film, perforated film, netting, coated or uncoated paper, ribbon, protective covers such as bubble pack, and other covering materials or the like. For convenience the wrap means has been and will be referred to as "film" in the disclosure.

The film, shown as a roll of film 48 is carried by the film elevator generally 16 (wrap means unwind or film dispensing unit) which is slideably mounted on a vertical track 50 A chain hoist is used to raise the film elevator. The chain 52 is attached to the film elevator at both ends and passes around a drive motor (not shown) which is inside the vertical track support 54 for convenience. The film is threaded (see FIG. 3) from the film roll 48 around a first main drive roller 56 then around a second main drive roller 58. These two rollers induce a significant amount of tension on the film (called "prestretch"). The film then passes dancer roller 60 which is movably mounted to control the speed of drive of the main drive rollers 56 and 58 allowing the speed of the main drive rollers to increase as film consumption is increased and decrease as film consumption is decreased. The film 62, after leaving the prestretchhead generally 16, then passes over a guide roller 64, a first guide arm roller 66 and a second guide arm roller 68, both of which are mounted on a film guide arm 70. The film then is directed to the wrap means clamp or film clamp 72 which is mounted on the turntable generally 12.

The film guide arm 70 serves to direct the film around the mast 46 and to the film clamp 72 mounted on the turntable generally 12. In a preferred embodiment the film guide arm is held in a fixed position but may be pivotally mounted for swinging movement about its attachment point to the film elevator generally 16. If the guide arm is pivotally mounted resistance to swinging by means of a spring, air cylinder or like may be advantageous in maintaining film tension to the film clamp 72.

In an alternative embodiment a pivotally mounted guide arm, being actuated by a motor of any type, by gravity or by springs, would be programmed to be biased from a first position to a second position to maintain tension in the film specifically when the film would normally have to be stretched and then released. By providing a pivoting mounted guide arm the amount of stretching and subsequent relaxation of the film could be controlled and minimized.

Returning again to a description of the preferred embodiment, the height of the guide arm and the length of the guide arm rollers is of sufficient length or height to accept the width of film being let off the film unwind. Typically film can be about twenty inches wide however wrap means wider or more narrow than twenty inches is also commonly used. It would not be unusual to use film that is as wide (or wider than) as forty inches or as narrow (or more narrow than) ten inches.

Figure 2:
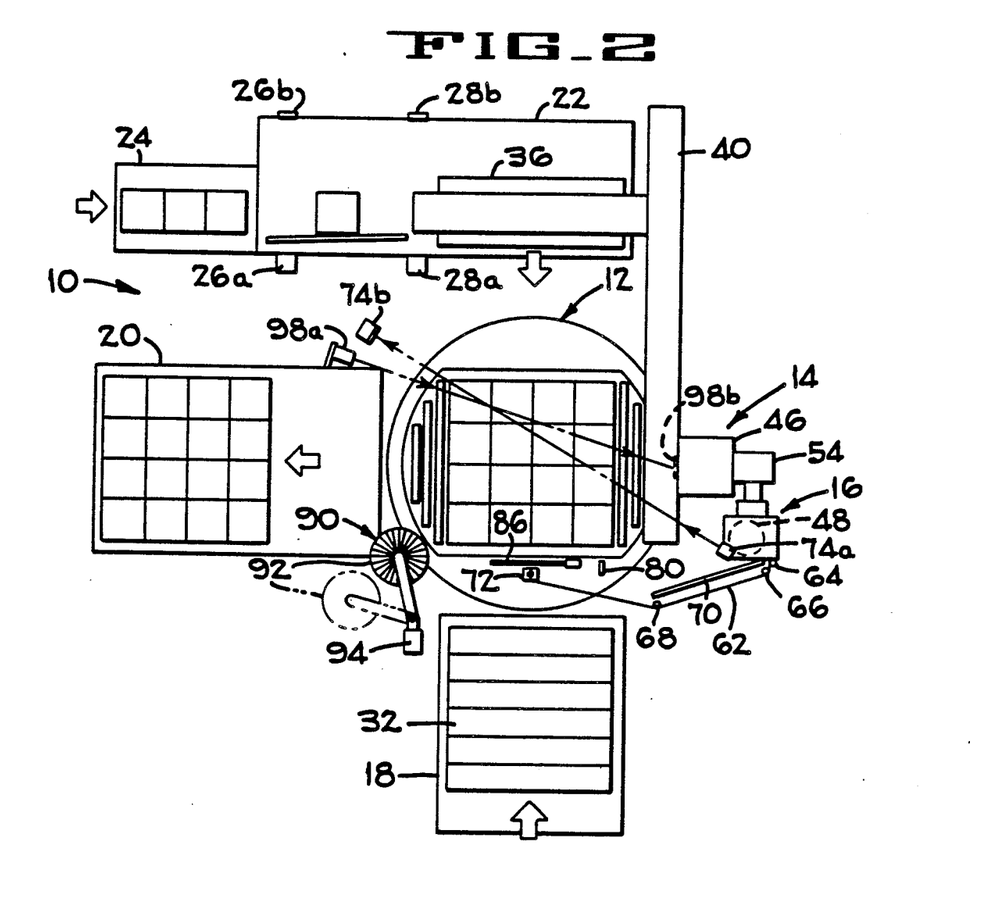
FIG. 2 is a plan view of FIG. 1.
Figure 3:
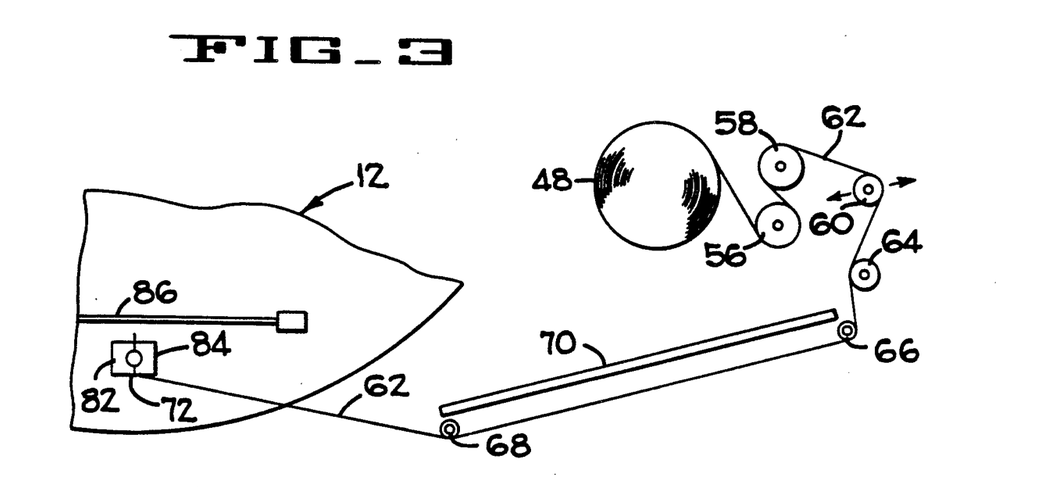
FIG. 3 is a schematic of the film pass line through the apparatus.
Figure 4:
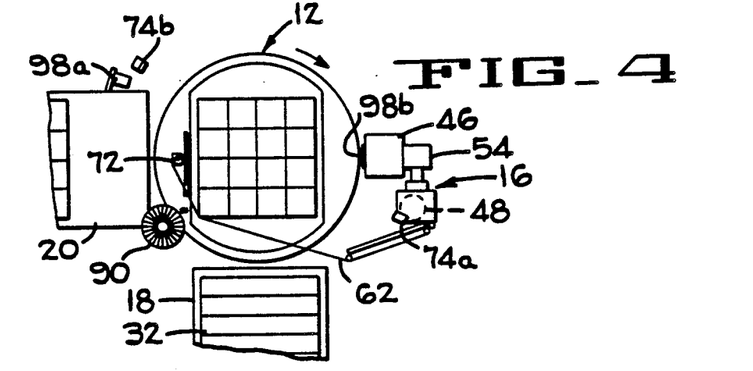
FIG. 4 is a pictorial plan view of FIG. 1.

The plan views presented in FIGS. 2, 3 and 4 have been presented to assist in providing an understanding of the apparatus.

In FIG. 2, for instance, the turntable generally 12 is shown with at least a partial load of boxes 25 already in place. The mast 46, boom 40, grasping means 36, product conveyor 22 (the rollers have been left out of these views for simplicity), the film elevator, generally 16, are each shown pictorially. Also the pallet infeed conveyor 18 and the pallet discharge conveyor 20, are shown with an empty pallet 32 and a fully palletized load 33 on the respective infeed and discharge conveyors respectively. The significant items that are more easily seen and understood in FIG. 2 than in FIG. 1 include the "line of sight" paths of the third photoeye set 74a and b, the pallet sensing photoeye set 98a and b. Also the preferred brush 92 position is shown in the solid line rendering of the securing means while an alternative position 92A, wherein if the brush were pivotally mounted to retract and move into the load, is shown in the broken line presentation.

As stated elsewhere in this disclosure, the pallet sensing photoeye set 98 is a conventional photoeye having an integral beam emitter and receiver represented as 98a and a reflector represented as 98b which will reflect the beam back to the receiver unless a pallet (or other item) blocks the light beam. When the beam is blocked the palletizer controller knows that a pallet is in position and the controller can initiate box stacking on the pallet. When a pull sheet or base sheet is the surface on which boxes will be stacked the photoeye set 98 may be replaced with a reflective photoeye sensing system or a manual or automatic switch or the like providing a signal to the controller that it can begin stacking boxes. It should also be realized that boxes can be stacked directly on the turntable surface for transport by a "palm" truck or if so desired.

The third photoeye set 74a and b can be seen in this Figure as well. This photoeye set senses the top of a layer of boxes. This input is used by the controller to control the vertical upward limit of the film elevator generally 16.

FIGS. 2 and 3 also show the film path from the film elevator 16 to the film clamp 72. In FIG. 3 the roll of film 48, from which film 62 is unwound is shown in a pictorial plan view. The film 62 is threaded around first and second main drive rolls 56 and 58, which are driven at a speed differential in a preferred embodiment in order to prestretch the film, then around a dancer roller 60 and a guide roller 64. The film then passes over first and second guide arm rollers 66 and 68 and then to the film clamp 72 which is shown in the "home" position (for the preferred embodiment) in all the Figures except FIGS. 4 and 5.

Figure 5:
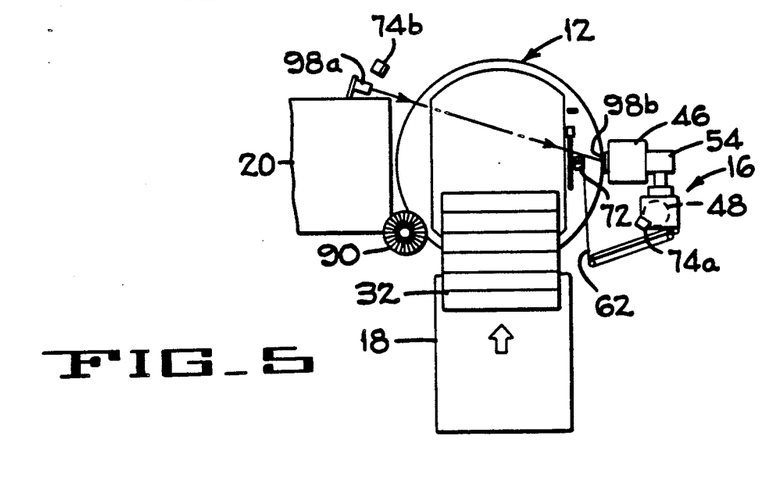
FIG. 5 is a pictorial plan view of FIG. 1.

In FIGS. 4 and 5 intermediate stages of a typical stacking and wrapping cycle are shown. In FIG. 4 a wrap cycle has been initiated and the turntable has rotated clockwise 90°, for example, on a first wrap cycle. The film 62 is held fast in the film clamp 72 and the film is seen to be in contact with the corner of the stack of boxes on the turntable. Upon the turntable reaching the home position one wrap of the stack of boxes will have been made. The cycle will continue as explained in this disclosure.

In FIG. 5 the loading or positioning of an empty pallet is shown. Since the film clamp 72 will normally be upstanding at the completion of the wrapping of a full load and will be in the "home" position shown in FIG. 2 it is necessary to get the film clamp (and the film 62) out of the path of the pallet 32 as it is being loaded. One way to do this is to rotate the turntable counterclockwise 90° as shown in this figure. It should be noticed that film 62 is taut when the film clamp is in the position shown in the Figure. The pallet sensing photoeye 98a will have its beam broken when the pallet 32 moves further into position on the turntable.

A wrapping cycle of a preferred embodiment palletizer represented by FIG. 1 will be initiated by the palletizer controller when a signal is received by the palletizer that the height of boxes desired for the first wrap cycle has been achieved. Good machine performance and stack integrity is achieved if the first wrap cycle is performed after two layers of boxes have been positioned.

In the first wrap cycle the film is being held clamped in the film clamp 72. The grasping means 36 has been cycled away from the partially stacked pallet and continues to cycle to pick up the next set of boxes while the first wrap cycle is being performed. The turntable generally 12 is rotated clockwise from a home position (from above), generally the zero and three hundred sixty degree position in this preferred embodiment, causing film to be pulled off the roll of film 48. Close in timing to the initiation of turntable rotation, that is either before, after, or simultaneously therewith, the film elevator generally 16 has been signaled by the palletizer controller to move vertically upward on the vertical track 50. Such upward movement of the film elevator will the lower switch 78 to open. Upward movement of the film elevator causes the film to be spiralled up the stack of boxes on the pallet as the turntable continues its rotation. The film is now being wrapped around the stack while still being held by the film clamp 72.

This first wrap cycle will continue until the palletizer senses that the top of the top layer of boxes has been reached. Generally, the first wrap cycle is accomplished in one 360° rotation of the turntable, however more than one rotation may be beneficial in some applications. The signal, signifying that the top layer of boxes has been reached, will come from photoeye three 74a which sends a beam of light to a reflector 74b mounted on a vertical support or reflector pale. The reflector 74b is a continuous reflector of significant length mounted on the reflector pole whose length is sufficient to accommodate boxes of different heights. When the photoeye sensor 72a senses the top of the boxes it will signal the palletizer controller to signal the film elevator drive to stop elevating the film elevator. At this point the turntable will continue rotating until it has returned to its home position. The film clamp 72 maintains the film in its clamped position.

Although the film elevator will normally be set to stop its upward travel at a point where the film does not go above the top of the boxes on the pallet it may be advantageous in some cases to allow the film elevator to go higher. If, for instance, the film elevator goes to a point such that the film is two inches higher than the top surface of the boxes the film will be stretched to be drawn inboard of the outer edges of the boxes. This may be advantageous, in stabilizing the stack, if the following set of boxes is then placed on this inwardly directed portion of the film.

Upon the turntable returning to the home position the stacking unit will commence stacking more layers of boxes on the pallet. It will stack, for instance, another two layers of product and signal the commencement of the wrapping cycle. The second and subsequent wrapping cycles will be, in a preferred embodiment, repeats of the first wrapping cycle until the full height of the palletized load is achieved— full height being the number of layers of boxes that have been preprogrammed into the palletizer controller.

When a fully stacked load has been accumulated on the turntable the top of the boxes of the top layer are sensed by the third photoeye set 74 and the film elevator will stop elevating the film roll to prevent the film from going off the top of the stack. This is the same as the sensing of the prior spiral wrap cycles.

As earlier pointed out in discussing the completion of the first wrap cycle it is possible to extend the film somewhat higher than the top of the top layer of boxes in order to provide some further unitizing assistance to the full load of stacked articles. The film elevator can be programmed to go slightly higher than the top of the boxes either immediately or internally to possible multiple wrap at the top of the stack.

Once the spiral wrap has been applied to the fully palletized load a unifying wrapping of the palletized load would be desirable to further unitize, strengthen and build integration into the palletized load. While the spiral wrapping accomplished in the first and several subsequent wrapping cycles serves to unify and help support the load as it is being stacked, allowing by the way, the building of load of column stacked boxes among other advantages, it may or may not be as complete a wrapping job as desirable for insuring integration of the palletized load.

It may be desirable, as an alternative, to do all the wrapping of the pallet load as the stack is being formed. In this case instead of just spiral wrapping o the way up the controller would direct the unwrapping head to stay at a horizontal position while the turntable made a single or a number of revolutions to wrap the stack at that level. This could be done at various heights on the stack as it is being built. This would lessen the time to wrap after the load has been stacked as some of this wrapping could be internal to the "picking" of the stacker.

Further wrapping, of the preferred embodiment style of the invention, and if desired would be completed as follows. With the film elevator high on the vertical track 50 and signaled not to go any higher by the photoeye set 74, the palletizer controller signals the turntable to make at least one full revolution, three revolutions works well, while the film elevator is held in its position relative to the top of the palletized load. After the desired number of revolutions have applied a "top wrap" and if desired the film elevator is signaled to let the film elevator travel down the vertical track 50 at a controlled rate while the palletized load continues to rotate. The film elevator may be directed to hold its horizontal position or to decline at a slow rate to apply more film at designated heights of the palletized load or it may continue to travel downwardly thus spiral wrapping the palletized load during its travel.

A sensor or intermediate switch 76, typically a micro switch or the like, will signal the palletizer controller when the lower portion of the film elevator is just above the top of the film clamp 72—which at this point in the cycle is still clamped to the leading edge of the film.

When this intermediate switch 76 is "made" the palletizer controller signals the film clamp to retract and let the leading edge of the film hang free. With the film clamp retracted to a position typically below the bottom of the first layer of boxes the film elevator generally 16 can continue its downward travel and wrap the bottom portion of the palletized load with several layers of film through several rotations of the turntable.

A variation of the first spiral wrap cycle or the first or second rotation of the full top wrap cycle would be to allow the film wrapper to position a portion of the film, on the order of several inches, more or less, depending on the stretch quantities of the stretch wrap film above the top of the top edge of the top layer of boxes. This could create a degree of improved integrity in some types of stacked products.

It would be possible to use this technique at the intermediate stages of the spiral wrapping operation however such technique is not the most preferred embodiment.

In some situations it is desirable to have the film extend over the supporting pallet, low box or the like on which the articles are stacked. This provides continuity between the supporting pallet and the articles so that the articles and the pallet are somewhat packaged together. This is not always necessary or desirable.

Returning to the completion of the cycle, the leading edge of the film has been rapidly covered, at least partially by the film being wrapped on the palletized load as the film elevator goes to the lower section of the load. Although the leading edge of film is rapidly covered through rapid rotation of the turntable, it has been found that a stream of air directed at the loose leading edge of the film is advantageous in holding the leading edge of the film against the load until the film can be overlayed with subsequent wraps of film. An air nozzle 76, which receives air from an air supply (not shown) provided to the turntable, is mounted on the turntable to accomplish this function.

On the final revolution of the turntable after the desired number of wraps or revolutions have been made it is necessary to position the film in the film clamp in preparation for the next palletizing operation. This is done in the final one hundred eighty degrees of revolution of the turntable. The film clamps are in a retracted deployment at the start of the clamping cycle. After the turntable has rotated one hundred eighty degrees on its final rotation a signal is sent to the palletizer controller to deploy the trailing element 84 of the film clamp It should be pointed out that the film clamp 72 is made up of two major clamping elements. These are the leading element 82 and the trailing element 84. The leading element is a structural member having a grip enhancing surface such as a rubber coating along its film engaging surface. The trailing element 84 also is a structural member with a grip enhancing surface. When film is positioned between the leading and trailing elements it is held fast until the film clamp is opened (just before the film elevator 16 interfaces with the upright film clamp 72).

Once the trailing element 84 has been deployed into an upstanding position—the leading element is still in a retracted or generally horizontal position—the continued rotation of the turntable will cause the trailing element 84 to contact the film between the palletized load and the film guide arm 70. The turntable continues its rotation and during this continued rotation the leading element of the film clamp is deployed into a position to clamp the film between the leading and trailing elements of the film clamp.

At this point the film is clamped in the film clamp but is still attached in a continuous sheet to the fully wrapped palletized load. To sever the film it has been found that a heated rod pivoted across the film path will cleanly cut the film. Such a heated rod film terminator or cutter is shown as 86 in a retracted position on the turntable. The heated rod is carried on a support that is pivotally mounted at one end and is further actutable by an air cylinder (not shown).

Once the film is severed by the heated rod or other film terminating means such as a hot wire, a knife, or the like, the palletized load is completed and it can be moved off the turntable.

In a preferred embodiment the turntable has a powered roller deck surface 88 that can discharge the palletized load to a pallet discharge conveyor generally 20.

However the palletized load is removed from the turntable it has been found that in some applications it is desirable to "pat down" or smooth over the trailing end of the film to remove trapped air for better tail adhesion to the load. This trailing film end is normally stuck to the film on the palletized load since it "springs back" somewhat after being cut by the heated knife 86. Nevertheless an optional step in the method of palletizing discussed here is to "pat down" the end of the film through the use of a securing means 90. The securing means shown in FIG. 1 is a brush 92 supported on a stantion 94 and having a drive means 96 for rotating the brush 92 as the pallet moves from the turntable to the pallet discharge conveyor 20. The brush may be spring loaded to be urged against the palletized load in the proximity of the trailing end of the film to thereby pat down the trailing end to the film below it on the pallet. The securing means can be any of several types of devices such as a soft surfaced or hard surfaced roller, a blast of air directed to the film trailing end, a stationary ramp that applies pressure to the film tail as it is delivered to the pallet discharge conveyor, or the like.

In situations such as shown by FIG. 5 where the film 62 will "go slack" as the turntable is rotated counter-clockwise and then get taut again as the film clamp 72 gets to the 90° position shown it has been found to be advantageous to control the amount of prestretch exerted on the film by the prestretch rolls, these being the first 56 and second 58 main drive rolls so that film is not payed out unnecessarily.

FIG. 6 is a chart that shows how the rolls 56 and 58 are turned off and on to assure that excess film is not fed. It should be noted that the drive rolls 56 and 58 are turned "on", stripping film from the film roll 48 in response to dancer roller 60, which is free to move inboard as shown by the arrow in FIG. 3, when more film is needed. This is contemporary film unwind practice. But when using prestretch film the film will, after being initially prestretched between rollers 56 and 58, "recover" causing dancer roller 60 to be pulled inboard and initiate driving feed by the rollers 56 and 58. This will happen to a controlled degree whenever the film is not being wrapped on the boxes—typically when the turntable is in the home position.

The FIG. 6 chart shows how the prestretch unit is shut off or turned on the final revolution of the wrap cycle and the reversing of the turntable to allow the pallet to be loaded. The controller is given signals from limit switches that are placed to pick up turntable position.

Starting at point A and progressing to B (arrowheads indicate direction of turntable travel) the film prestretch unit is "on", that is it is operative to feed film during this final revolution of the load and turntable. At point B approximately 330° of rotation the prestretch unit is turned off ceasing the possibility of feeding of film (B, to C). From C, to D the turntable is moving counterclockwise to approximately 270° as shown in FIG. 5—prestretch unit is off. After the pallet is loaded the turntable rotates clockwise and at approximately 330° (D, to E, prestretch unit is off) the prestretch unit is turned on for the duration of the revolution (E, to F).

Figure 7:
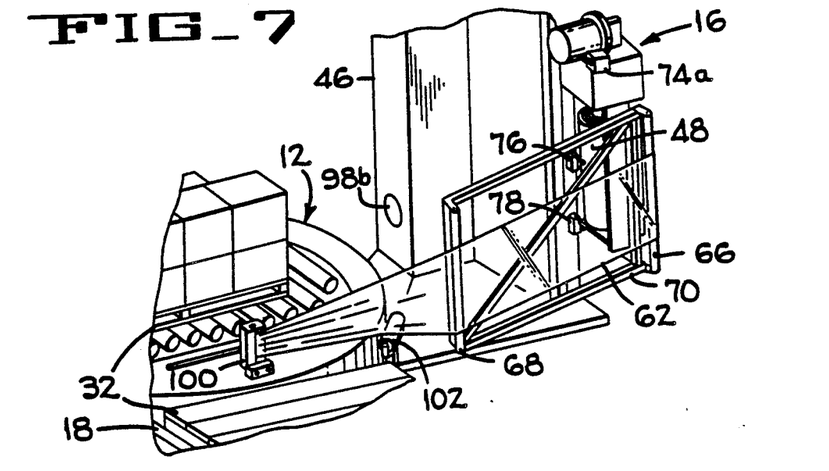
FIG. 7 shows an alternative embodiment of the invention.

FIG. 7 shows an alternative embodiment of the invention specifically directed to the use of a short film clamp 100. All other aspects of this embodiment are the same as shown in FIG. 1 with the exception of the short film clamp 100, the added film roping roller 102 and the repositioning of the lower switch 78 to a position lower on its support than the position of the switch in the FIG. 1 embodiment.

In this embodiment the film clamp 100 is shorter than the width of the film 62. The film 62 is thus "roped down" as shown to fit into the jaws of the film clamp. The film elevator 16 has dropped so low on the vertical track 50, due to the low position of the limit switch 78, that the film would foul on the upper surface of the turntable. The roping roller 102 guides the film above the turntable surface and as it does it tends to "rope down" the film. The advantage of the shorter film clamp 100 is that on the initial wraps of the lower levels of boxes the film elevator doesn't have to be lifted as high to clear the short film clamp as it would if there were a taller film clamp (FIG. 1) being used. This allows wrapping more of the lower level of the stacked boxes which may be advantageous for some loads.

Figure 8:
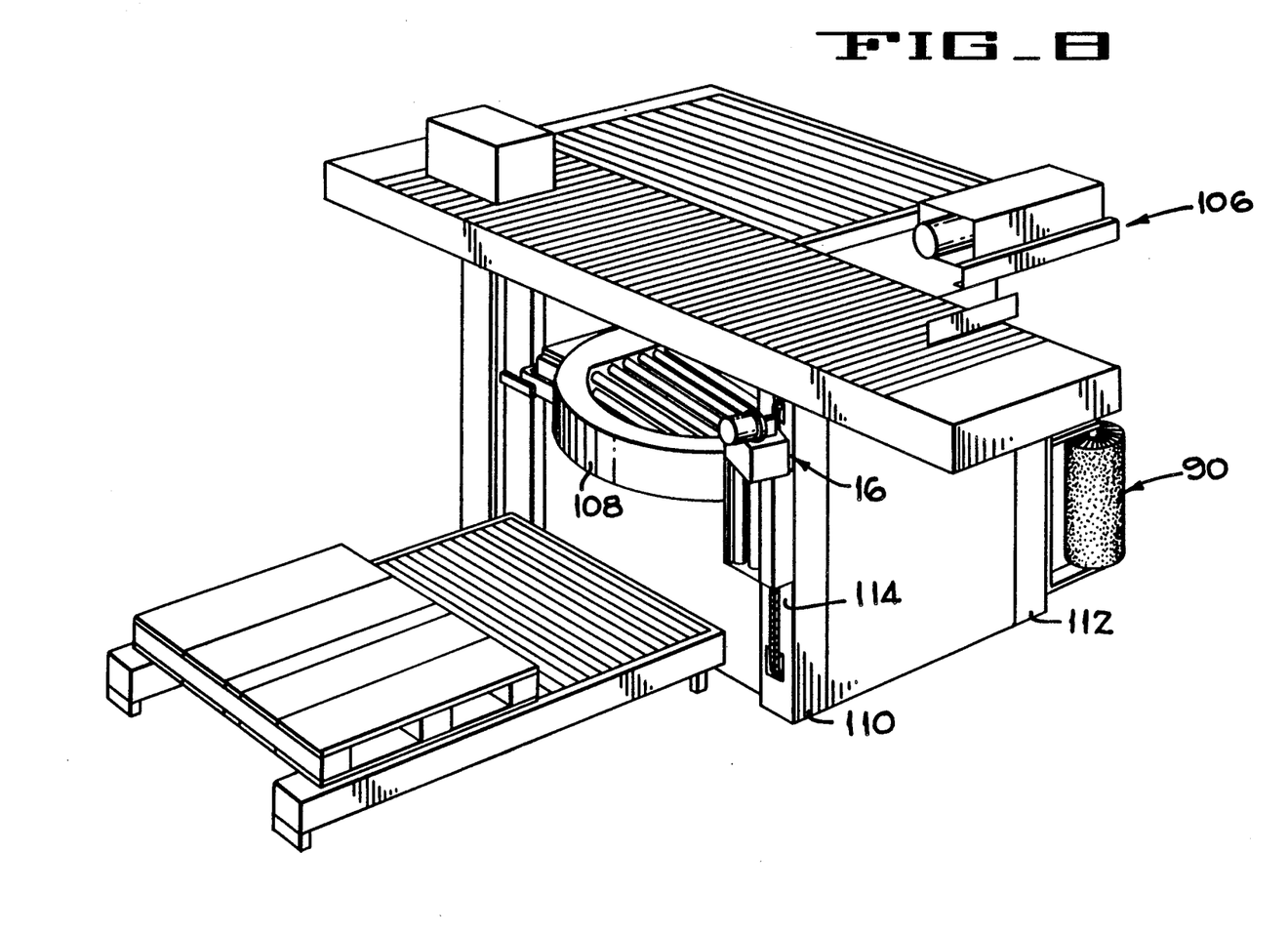
FIG. 8 shows a pictorial representation of an alternative embodiment of the invention.

Another alternative embodiment of the invention is shown in FIG. 8. This figure presents a conventional case palletizer generally of the type sold by the assignee of this invention. The conventional case palletizer, has been made unconventional through modifications that enable it to wrap a layer of articles in the manner discussed above in the palletizing unit itself. The unitizing or palletizing unit, generally 106 has been modified by putting an elevatable turntable 108 in place of an elevatable platform and by providing a film elevator, generally 16, as described above on one of the support stands 110, and by providing a securing or pat down means or brush generally 90 on a second support stand 112 of the palletizer.

In this embodiment a stack of articles is on the turntable when the turntable is at the top of its travel. The first layer of boxes is placed on the turntable and rotated to wrap it, the wrapping cycle being as described above for the preferred embodiment, then the turntable will be lowered to receive the next layer of boxes. The film elevator may travel down with the turntable and then upward on its guide surface while wrapping or it may remain in a high position and wrap after the turntable has been lowered.

The film elevator is elevatable up and down the guide surface 114 and is cabable is being raised lowered independent of the turntable. This allows a fully stacked pallet load to be wrapped from the top or the bottom of the stack when the turntable is lowered to a low level.

In this embodiment the film guide arm 70 and its attendent hardware may be eliminated as the film letoff is close enough to the stack being wrapped that it is not necessary. Also this palletizer doesn't have a boom such as 40 traveling up and down a mast and possibly interfering with the film 62.

This disclosure has attempted to set forth a description of apparatus that can stack and unitize a collection of articles into a unified package. Although several modes of carrying out the invention, including a best mode known to the inventors, have been disclosed it is contemplated that nuances of design and engineering expediancies may be utilized in the design of a unitizing wrapper. Such nuances and expediancies are contemplated by the inventors and are sought to be covered by the following claims.

What is claimed is:

1. Apparatus for creating a unitized stack of articles by alternately forming a layer of articles and wrapping said layer of articles without the need for an article guide frame and wherein a portion of the stack of articles is free standing the stack is unitized, the apparatus comprising:

an elevatable turntable for supporting said stack of articles, said elevatable turntable receiving a layer of articles and then being lowered to receive a subsequent layer of articles;

a palletizer cooperating with said elevatable turntable for stacking a layer of said articles on said turntable or on a previously deposited layer of articles;

wrap means serving means for serving wrap means to said turntable to wrap a layer of articles unsupported by a guide frame while said turntable is rotated after said palletizer has located said articles to form a layer of articles on said turntable or on a previously formed layer of articles and prior to said palletizer locating subsequent articles on said previously deposited articles;

cutting element means for severing said wrap means after said wrap means serving means has served wrap means to multiple layers of articles stacked on said turntable by said palletizer.

2. A method of unitizing a stack of articles without the need for an article support frame wherein a portion of the stack is free standing before being unitized including the steps of:

feeding an empty pallet means to an elevatable turntable;

accumulating a number of articles to be stacked on said pallet means or on previously stacked articles above said turntable;

transferring said accumulated articles to said pallet means;

lowering said elevatable turntable to a position where said articles on said layer are free standing without the need for an article support frame;

rotating said pallet means by rotating said elevatable turntable;

feeding film from a film storage roll to said rotating elevatable turntable to wrap said layer of free standing articles in film as said turntable rotates prior to forming a subsequent layer on said previously deposited articles;

repeating the above steps until a full pallet of unitized articles is accumulated;

cutting said film after at least one rotation of said elevatable turntable.

* * * * *